Nov. 28, 1961 — J. A. McWILLIAMS — 3,010,706
PACKING FOR VAPOUR-LIQUID CONTACTING SYSTEMS
Original Filed Nov. 25, 1953 — 7 Sheets-Sheet 1

INVENTOR
JOSEPH ANTHONY McWILLIAMS
By Lawson and Taylor

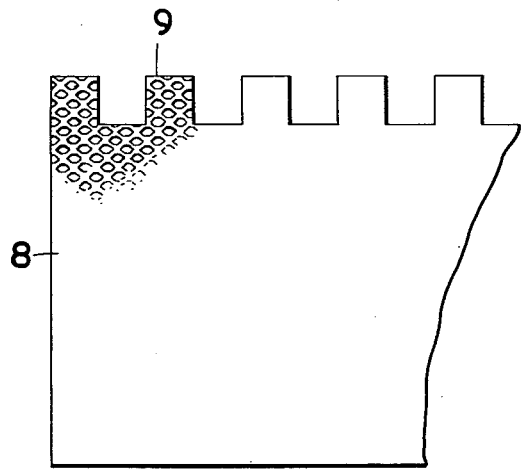
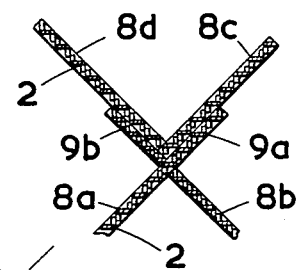
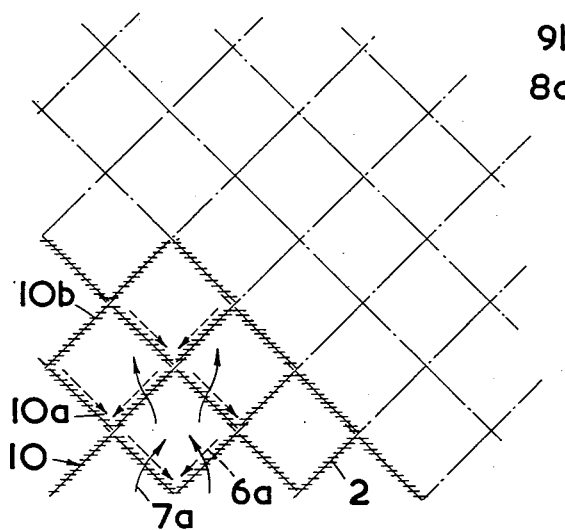

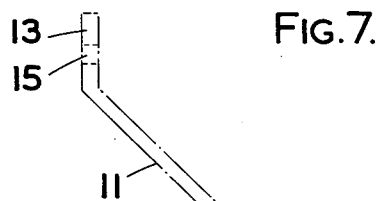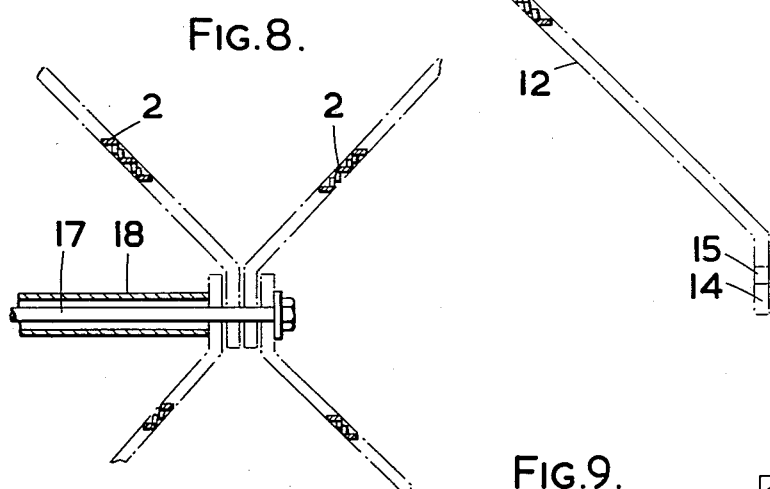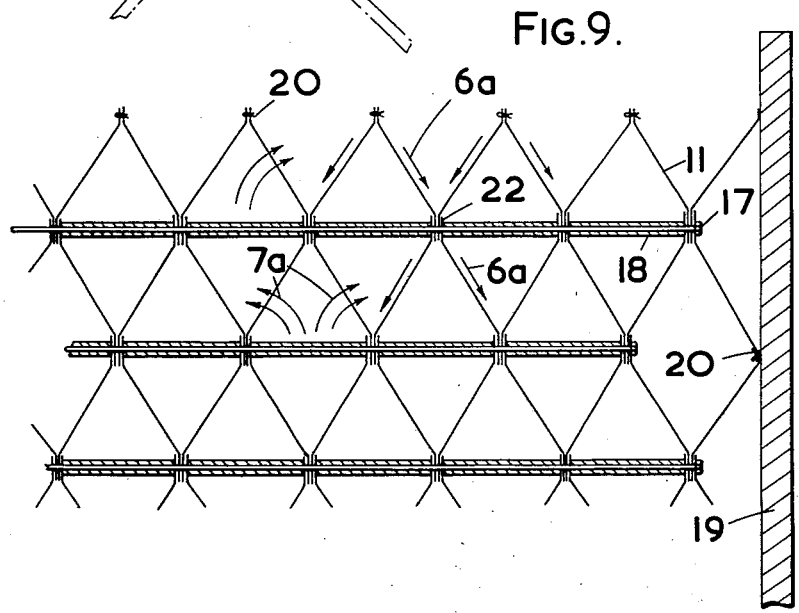

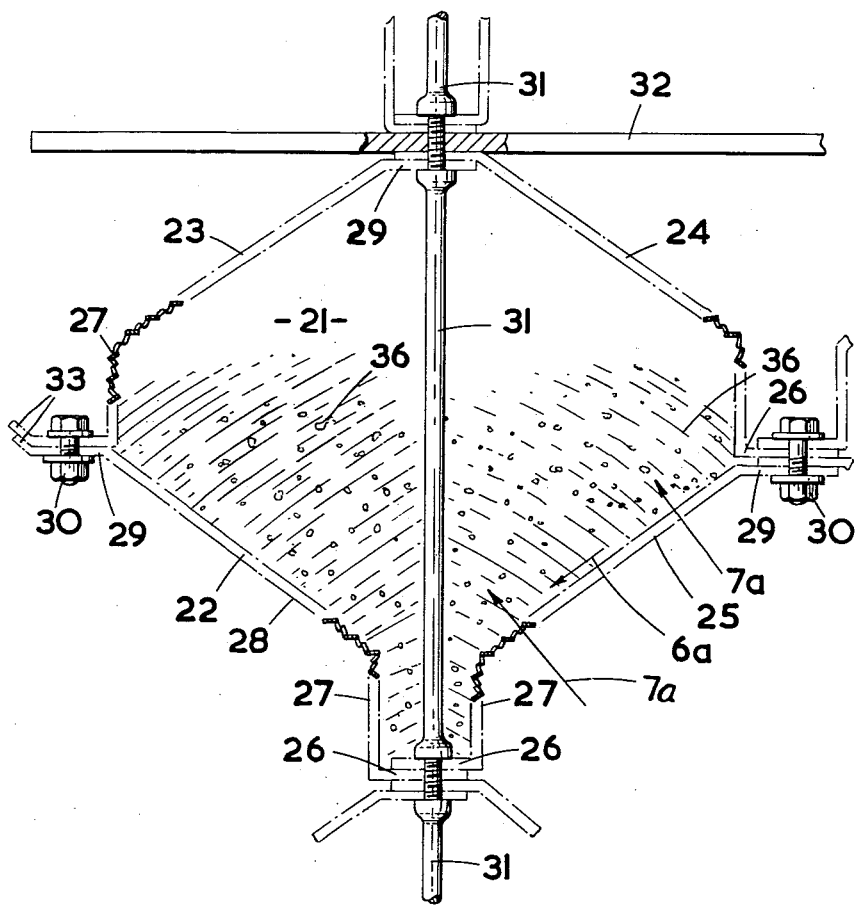

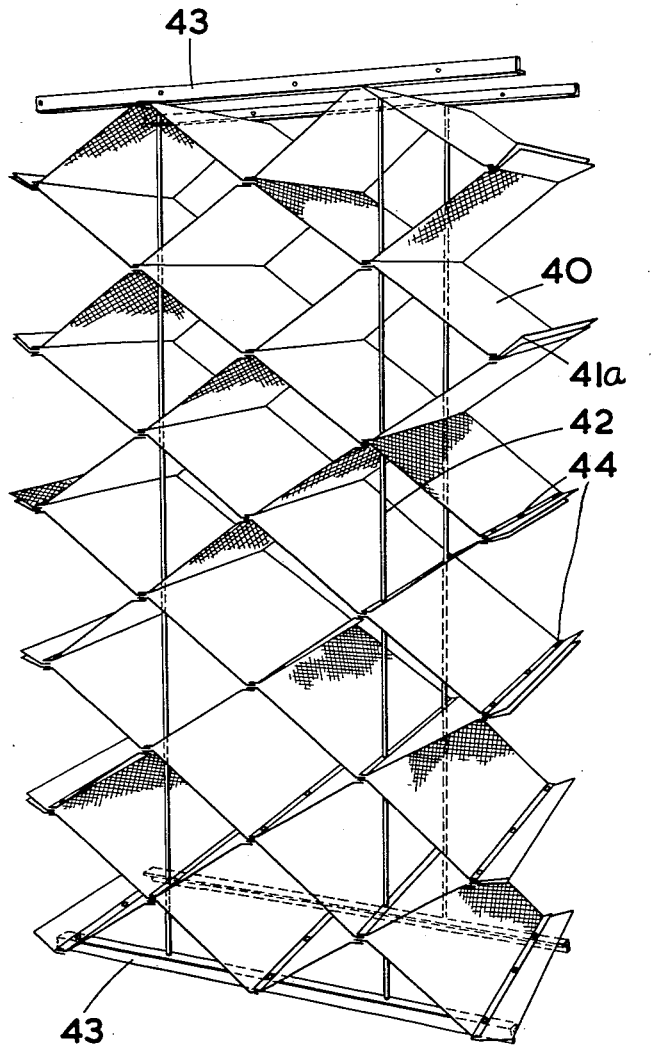

Nov. 28, 1961   J. A. McWILLIAMS   3,010,706
PACKING FOR VAPOUR-LIQUID CONTACTING SYSTEMS
Original Filed Nov. 25, 1953   7 Sheets-Sheet 6

INVENTOR
JOSEPH ANTHONY McWILLIAMS
By Lawson and Taylor

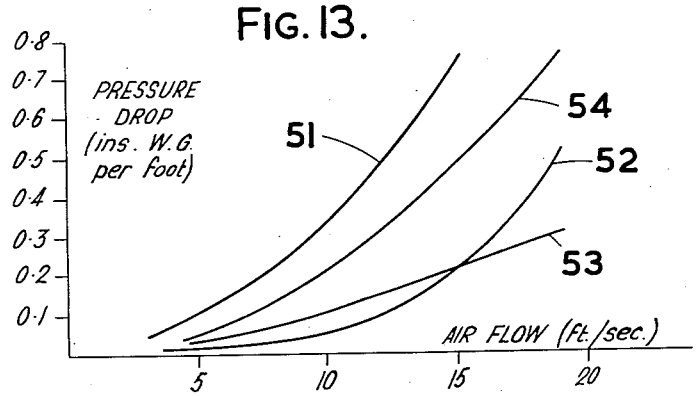
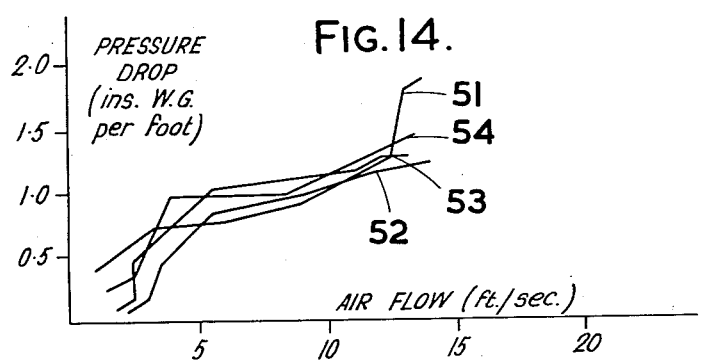
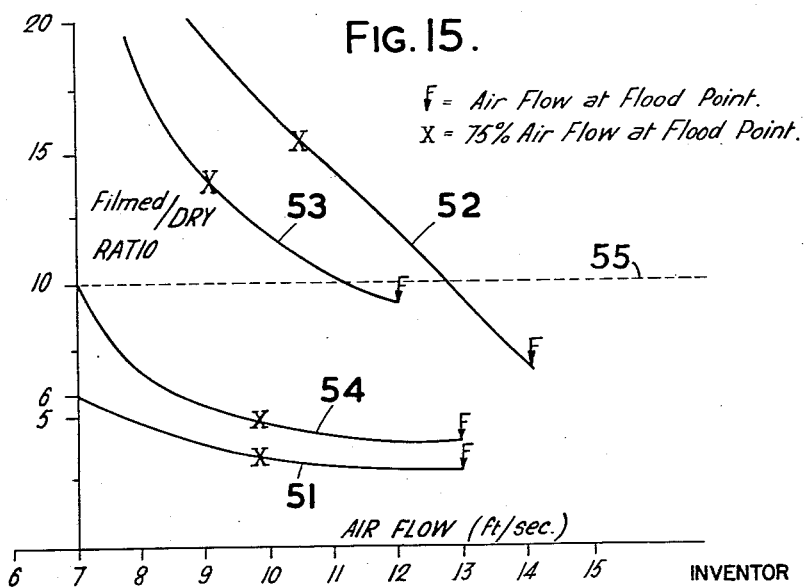

United States Patent Office  
3,010,706  
Patented Nov. 28, 1961

3,010,706  
PACKING FOR VAPOUR-LIQUID CONTACTING SYSTEMS  
Joseph Anthony McWilliams, Kidderminster, England, assignor to United Kingdom Atomic Energy Authority, London, England  
Continuation of application Ser. No. 394,455, Nov. 25, 1953. This application Apr. 13, 1959, Ser. No. 805,959  
Claims priority, application Great Britain Nov. 29, 1952  
3 Claims. (Cl. 261—100)

This invention relates to packings for vapour-liquid and gas-liquid counter-current contacting systems, such as distillation columns, adsorption columns and cooling towers, made from foraminous material shaped to provide a cellular structure. The present application is a continuation of application Serial No. 394,455, filed November 25, 1953, now abandoned.

A selection of the literature referring to the above-mentioned type of packings includes the Stedman packing (U.S. Patent No. 2,047,444), the Watson packing (Ind. Chem. 1949, 25,503) and the Scofield packing (U.S. Patent No. 2,470,652). The Stedman packing comprises a column of capillary material, the capillary openings of which seal with liquid under treatment, arranged to provide a multiplicity of cells uniformly distributed throughout the column, vapour passages through said capillary material larger than said capillary openings whereby each cell receives vapour from at least two other cells and uniformly disposed contact surfaces throughout the column to provide for repeated subdivision and recombination of liquid passing through the column. In this packing the liquid phase remains on the walls of the cells and the vapour phase passes through the vapour passages in the walls which are large enough not to be filmed over by the liquid phase so that only the vapour phase exists in the cells. Mesh openings of .01 inch are quoted as being satisfactory.

The Watson packing followed the principles of the Stedman packing but uses a double sheet of gauze. The packings were made from 36 mesh gauze with a wire diameter of 0.01 in.

The Scofield packing comprises a plurality of superposed porous mats of undulating shape, the ridges of each mat contacting the troughs of the mat above it to provide for downward flow of liquid through the packing, each mat comprising a plurality of undulating foraminous metal sheets in capillary contact, the openings in the sheets being larger than capillary size and in non-registering relation, thereby forming tortuous vapour passages through the mats unsealed by the liquid. In this Scofield packing a substantial portion of the liquid phase is conducted downwardly along the individual filaments or strands around the openings in the sheet and it is essential that the sheets in the mats have a "non-filming" characteric so that voids exist to create the tortuous vapour passages. Scofield points out that a single sheet of coarse meshed screen is incapable of controlling or directing the flow of large volumes of liquid along its inclined surface and consequently a number of such superimposed sheets are required.

It is an object of the present invention to provide a packing for vapour-liquid and gas-liquid contacting systems which is relatively cheap to construct so that the use of stainless steel for the construction of the packing becomes economically feasible.

It is a further object of the invention to provide a packing suited for high throughput with small pressure drop and good contacting efficiency.

It is also an object of the invention to provide a packing which is light in construction so that it can be manually shaped and cut with simple tools if so required.

According to the invention, a packing for a vapour-liquid and gas-liquid counter-current contacting system comprises a cellular structure the cells of which have inclined walls made of single sheet foraminous material of a mesh capable of supporting sheet-like liquid flow rupturable uniformly to cause bubbling or spraying by crosswise gas flow.

The preferred material of construction is expanded metal of the kind known as "mill-expanded metal sheet." It is known to produce expanded metal in two forms; one form, which is commonly used in plasterwork is referred to as expanded metal lath and is characterised in that it customarily has a large mesh and that the nodal webs in the metal are, in the expanded direction, alternately vertical and inclined to the plane of the metal. The other form, herein referred to as mill-expanded metal sheet, and sometimes referred to as precision-cut expanded metal and commonly used for decorative grilles can be made in a smaller mesh and is characterised in that the nodal webs in the metal are all inclined to the plane of the sheet and at the same angle, the apertures in the metal being of diamond shape.

The mill-expanded metal sheet is preferably arranged to form the packing with the plane of the sheet inclined at between 15° and 55° and the nodal webs approximately horizontal. The sheets can be assembled to form similarly sectioned horizontal prismatic cells, such as diamond shaped cells. In such an assembly the size of the cells is an optimisation of various factors and a cell having a height of the order of six inches and a width of ten inches regardless of column size is found to be suitable. With smaller cells the "Height Equivalent to a Theoretical Plate" (H.E.T.P.) decreases but throughput decreases also whilst with large cells a gain in throughput is counterbalanced by an increased H.E.T.P. figure.

In the study of the behaviour of various single sheet foraminous packing materials for vapour-liquid and gas liquid counter-current contacting systems, it is observed that for some of those materials the wetted appearance is not uniform and spray formation is irregular under operating conditions and they have a poor contacting efficiency whilst other materials acquire a more uniform wetted appearance and spray formation and have a superior contacting efficiency. In the poor materials it is observed that some parts appear to be filmed with liquid from which spray arises only at high vapour or gas rates whilst other parts appear to be mainly dry with limited spray formation. In the better materials most of the packing appears to be filmed, the filming having a shimmering appearance which suggests a rapid and repeated breaking and reforming of the films over the apertures in the material, and there is copious spray formation which brings about redistribution of the liquid phase over the packing.

An analysis of the above behaviour has led to the conception that in poor materials the ratio of resistance to gas or vapour flow between the filmed and the dry parts of the packing is so great that the gas or vapour flow readily by-passes the filmed parts through the dry parts such that spray formation is inhibited and then in the absence of a copious liquid spray the dry parts do not become filmed.

In the better materials the ratio of resistance to gas or vapour flow between the filmed and dry parts of the packing is smaller, the filming is more uniform and is broken and reformed uniformly due to the redistribution caused by the copious spray formation.

It is convenient now to define a ratio, called "the filmed to dry ratio of a packing," as the ratio, for a given gas flow, between the resistance to that gas flow with liquid flowing over the packing to the resistance to the same gas flow with no fluid flowing over the packing. With this definition the invention can also be stated as a packing for a vapour-liquid and gas-liquid counter-current contacting system comprising single-sheet foraminous material shaped to provide a cellular structure having inclined walls the mesh of the material being of such a size and shape as to have a filmed-to-dry ratio in an air-water system of less than ten when operating with an air flow of 75% that at the flooding point.

The reciprocal of the filmed-to-dry ratio is a measure of the ease with which the sheet-like liquid flow in a packing is ruptured, which is a function of the mesh size and shape. The size is required to be intermediate between the capillary openings of Stedman which seal with liquid and the "non-filming" openings of Scofield. The shape is preferably such as to require the gas to change its direction abruptly in passing through an opening in the packing and the liquid to cascade over the opening and only require to be deflected slightly by the gas in order to be blown clear of the packing. These features of size and shape of the mesh openings which reduce the filmed-to-dry ratio in a packing otherwise designed to support unbroken sheet-like liquid flow, while primarily intended to promote the early onset of spray formation and so prevent channelling, are also, when combined with a cellular structure having inclined walls of single sheet foraminous material, especially expanded metal, capable of producing a copious uniform spray formation over a large range of gas rates.

The invention is further described with reference to the accompanying drawings wherein:

FIG. 4 is an elevation of a sheet of one form of the packing cut to form one wall of a diamond shaped lattice packing.

FIG. 5 shows diagrammatically the assembly of the diamond shaped lattice.

FIG. 6 shows the junction of four sheets of the kind shown in FIG. 4.

FIG. 7 shows an end elevation of flange-ended form of single sheet to form one wall of a lattice.

FIG. 8 is a sectional view showing a junction and method of securing four sheets of the type shown in FIG. 7.

FIG. 9 is a diagrammatic elevation of part of an assembled packing using sheets of the type shown in FIG. 7.

FIG. 10 is a sectional view of one complete cell of a packing showing one form of construction.

FIG. 11 is a perspective view of another assembled packing using a different form of construction.

FIG. 13 is a graph showing pressure drops for a variety of materials (each identified by a number) in the dry state.

FIG. 14 is a graph showing pressure drops for a variety of materials (similarly identified as in FIG. 13) in the filmed state.

FIG. 15 is a graph showing the filmed to dry ratios for the materials used in FIGS. 13 and 14.

Figure 1:
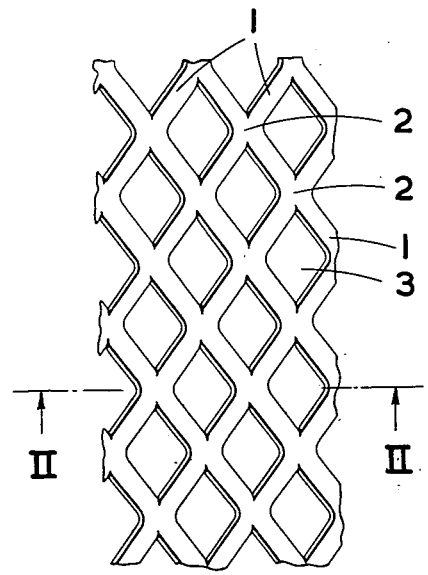
FIG. 1 is a plan view of part of a sheet of mill-expanded metal sheet.
Figure 2:
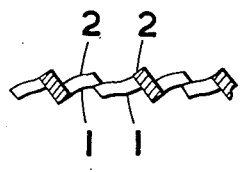
FIG. 2 is a sectional elevation on the line II—II of FIG. 1.

In FIGS. 1 and 2 the mill expanded metal sheet has webs 1 connecting nodal webs 2. All these webs have a common inclination so that the webs in a vertically arranged sheet are disposed in the fashion of vertical or horizontal louver boards according to the orientation of the sheet i.e. with the expanded incisions vertical or horizontal respectively. Apertures 3 exist between the webs, their larger dimension being about twice the smaller dimension.

Figure 3:
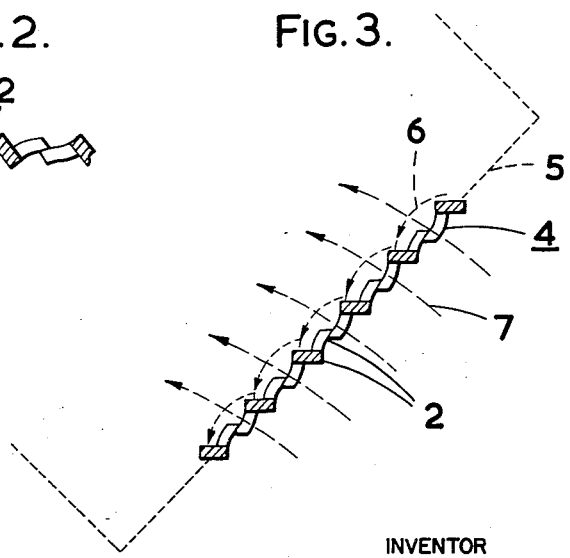
FIG. 3 is a sectional elevation of an inclined sheet of mill-expanded metal sheet showing its use as a packing material for vapour-liquid and gas-liquid counter-current contacting systems.

In FIG. 3 a mill-expanded metal sheet 4 (like that shown in FIGS. 1 and 2) is shown inclined at 45° to form one wall of a diamond-shaped lattice 5. The nodal webs are seen to take up an approximately horizontal position with a slight downward inclination. This inclination is not critical, however, and may be inclined up to ±20°–30° from the horizontal without seriously affecting the operation of the packing. Liquid flowing over such a sheet or fed to the sheet at the top passes over the surface with very little penetration; this flow is shown by the broken line arrows 6. The apertures in the sheet allow the passage of vapour crosswise to the liquid flow as shown by the broken line arrows 7.

One form of assembly of the lattice is now described with reference to FIGS. 4 to 6. The lattice is formed with sheets 8 as shown in FIG. 4 cut to provide tongues 9 on the upper edge. Pairs of such sheets are placed together to form an inverted V with the tongues interlocking at the apex, thus forming the bottom layer 10 (FIG. 5) of the lattice. Additional layers 10a, 10b etc. are built up on the bottom layer as shown in FIG. 5. FIG. 6 shows in more detail the junction of four sheets of the packing. Sheets 8a and 8b having tongues 9a and 9b along their upper edges are interlocked and sheets 8c and 8d have their lower edges resting in the cradle formed by tongues 9a, 9b. The nodal webs 2 are shown disposed in horizontal louver fashion, gas flow through the packing is shown by arrows 7a and liquid flow over the packing by arrows 6a.

Another form of lattice assembly is now described with reference to FIGS. 7 to 9. In FIG. 7 a mill-expanded metal sheet 11 has an inclined part 12 and flanges 13, 14. The flanges each have holes 15 which are used to accommodate assembly bolts in a manner shown in FIG. 8. Four sheets 11 are arranged so that their flanges overlap and their holes 15 coincide. The sheets are assembled so that their nodal webs 2 are approximately horizontal and the sheets obtain support from tubular spacers 18. A bolt 17 passes through the holes 15 and tubular spacers 18. In the assembly of FIG. 9 an assembled packing is shown in contact with a container 19. The uppermost walls and the side walls of the lattice are wired with loops 20. In use, liquid flows down the walls of the packing as indicated by arrows 6a.

There is convergence of liquid at the junctions 22 and followed by divergence along the walls of the next layer in the lattice. Gas flow through the lattice is shown by arrows 7a.

In FIG. 10 the cell 21 of the packing, which is of six-sided prismatic shape, is defined by four wall members 22, 23, 24 and 25 of expanded metal which are similar in shape but orientated differently. Each wall member consists of a horizontal part 26, a vertical part 27, and inclined part 28 and a horizontal part 29. The parts 26 and 29 are bolted together with bolts 30 and periodically throughout the packing screwed spacers 31 are provided with cross-ties 32 to give rigidity and support to the whole packing. At the wall side of the packing upwardly turned lips 33 are provided on the parts 26 and 29.

In the operation of the packing liquid flows sheetwise over the members 22, 23, 24 and 25 as indicated by arrows 6a (in the absence of gas or vapour flow) whilst the vapour or gas flows crosswise through the packing as indicated by arrows 7a to rupture the fluid sheet. For fast gas or vapour velocities a spray 36 is set up in the cell 21 which is carried over to the adjacent wall so that in operation it appears that the walls of the cells are continually and uniformly wetted.

In FIG. 11 an assembled rectangular pack is shown to form a diamond lattice cell construction. Each wall of the cells is made from a single sheet 40 of mill-expanded metal having horizontal flanges 41 (upturned as shown at 41a at the edge of the packing). The construction is similar to that of FIG. 10 except that there are no vertical wall parts 27 (FIG. 10) to the cells. The sheets are spaced apart by spacers 42 and fixed to a frame 43. A series of such elements may be fitted into a column after assembly outside the column, or for large columns the assembly may be built up sheet by sheet inside the column. Where spacers 42 are not fitted clamping is obtained by bolts 44; alternatively small spot welds can be made.

Figure 12:
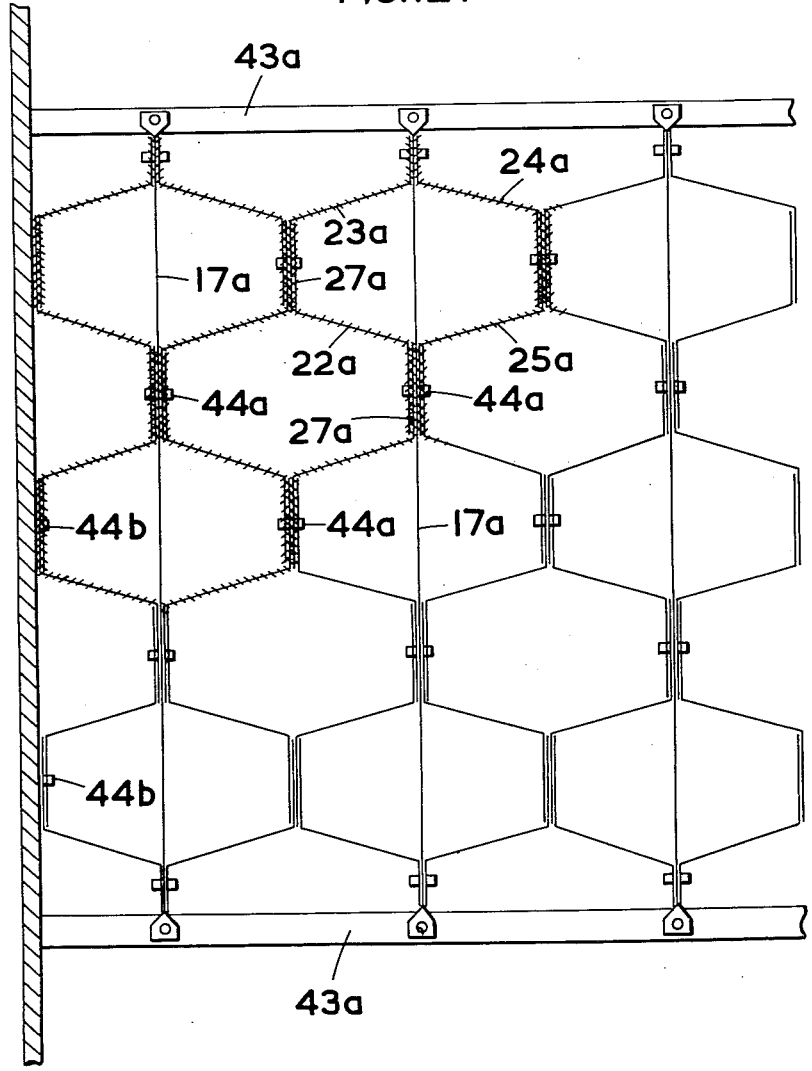
FIG. 12 is a sectional elevation of a further form of packing construction.

A method of suspending a six-sided prismatic cell packing in accordance with the invention is shown in FIG. 12. Each cell is defined by four wall members 22a, 23a, 24a and 25a having top and bottom vertical extension 27a which completely overlap the vertical extension of adjoining wall members and form 4-layer vertical walls which are secured together by bolts 44a. Flat strip metal hangers 17a extend vertically through each cell in the upper row and are sandwiched between the pairs of walls constituting the 4-layer vertical walls of the row below and so on down through the pack. They are secured by the bolts 44a. The hangers are secured top and bottom to horizontal frame members 43a and the 2-layer vertical walls at the edge of the pack are secured directly to the column walls by bolts 44b.

In another particular form of invention, 24 S.W.G. stainless steel base sheet is expanded by a 1/8" mesh knife having 2½ serrations per inch and means for shifting the knife sideways by one-half of a serration between strokes so that five holes per inch long-way of the mesh is obtained and the stroke of knife is adjusted to give 4½ holes per inch short-way of the mesh with a web of one-sixteenth of an inch, and the sheet is assembled to form square-section prismatic cells having five inch side walls inclined at 45°. Such an assembly has been found suitable in an air/water test column. Wall slopes of less than 45° may be used to obtain a thicker liquid sheet flowing over the walls but in a simple diamond cell the distance between "roof" and "floor" in each cell is thereby reduced which leads to earlier flooding. Wall slopes of more than 45° provide a thin liquid sheet with poor efficiency at low liquid rates. With wall slopes of less than 45° vertical side walls (walls 27 in FIG. 10 and 27a in FIG. 12) can be introduced to increase the height of the cells so as to be suitable for high vapour and low liquid rates.

Referring to FIGS. 13-15, the tests from which the graphs were obtained were carried out in a rectangular section column 27" x 15" with the material arranged like that shown in FIG. 11 in a 7" square diamond lattice with a water flow rate through the packing of 15 gallons per minute.

Materials No. 51, 53 and 54 are 1/8" mesh mill-expanded metal sheet having five holes per inch long-way of the mesh and four and a half holes per inch short-way of the mesh. Material No. 52 is 1/8" mesh gauze. Material 51 is orientated so that the nodal webs are substantially horizontal as shown in FIG. 3; material 53 is orientated so that the nodal webs are vertical and material 54 is orientated so that the nodal webs are oblique; this being achieved by arranging the sheets sideways on as compared with the arrangement for material 51, i.e. so that liquid flow is in the direction of the expanded incisions.

In FIG. 15 the limit for a filmed to dry ratio of 10 is shown as a dotted line 55 and as in accordance with the invention it is seen that materials 51 and 54 fulfill the condition of a filmed to dry ratio of less than ten; the other materials far exceeding this ratio.

It is considered that the downward passage of the fluid in a packing according to the invention is mainly by way of rebounding spray droplets, a droplet of liquid being blown off one part of the packing to be deposited on another part where it spreads on impact to combine with other liquid whence a further droplet is formed and the process repeated down the packing; this is supported by the good contacting efficiency which suggests a copious breaking and reforming of the liquid in its passage through the packing.

It is also considered that the low filmed-to-dry ratio possessed by the packing prevents the onset of the phenomenon known as "channelling" which is known to limit the size of column in many forms of packing to about three foot.

The lattices shown in the drawings are cheaper to construct than those lattices made from mats consisting of several layers of expanded metal and hence it becomes a reasonable economic proposition to use for their construction selected high cost materials such as stainless steel or special purpose plastics. They are also substantially lighter than multi-layer packings with a consequent saving in constructional costs and reduction of internal supporting members.

I claim:

1. A packing for vapour-liquid and gas-liquid counter current contacting columns comprising single layer sheet material arranged to form the walls of a stack of prismatic cells, the walls being inclined to the vertical line of the stack, the single sheet being formed of expanded material with all of the nodal webs thereof disposed within an angle of 30° of a horizontal position so as to provide cascading of the process liquid over the mesh openings in the form of a film, the material extending uninterruptedly over the entire cross-section of the stack, the mesh of the material being intermediate a small size at which under operating conditions the openings would seal with liquid under treatment and a large size at which closure by capillary action by said liquid would be prevented whereby under said condition the film is disrupted at any opening by the process vapour or gas to form a spray as readily as the film is formed.

2. A packing for vapour-liquid and gas-liquid counter current contacting systems comprising single sheet material arranged to form the walls of a stack of similar prismatic cells, the walls being inclined to the line of the stack, the single sheet being formed of mill-expanded material with the nodal webs thereof horizontally disposed, the material extending uninterruptedly over the entire cross-section of the stack, the mesh of the material being intermediate a small size at which the openings seal with liquid under treatment and a large size at which closure by capillary action by said liquid is prevented.

3. A packing according to claim 2 the material having a filmed-to-dry ratio in an air water system of less than ten when operating with an air flow of about 75% that at at the flooding point.

References Cited in the file of this patent

UNITED STATES PATENTS

| | | |
|---|---|---|
| 2,047,444 | Stedman | July 14, 1936 |
| 2,227,164 | Stedman | Dec. 31, 1940 |
| 2,290,162 | Bragg | July 21, 1942 |
| 2,470,652 | Scofield | May 17, 1949 |
| 2,594,585 | Ridgway | Apr. 29, 1952 |

FOREIGN PATENTS

| | | |
|---|---|---|
| 123,245 | Australia | Jan. 3, 1947 |
| 147,213 | Great Britain | Apr. 7, 1921 |
| 427,087 | Great Britain | Apr. 16, 1935 |
| 869,527 | France | Nov. 7, 1941 |